(12) United States Patent
Kim et al.

(10) Patent No.: US 11,783,415 B2
(45) Date of Patent: Oct. 10, 2023

(54) METHOD FOR PROVIDING SERVICES REQUIRING PRIVATE INFORMATION USING ACCESS RIGHTS IN DISTRIBUTED NETWORK AND RECORDING MEDIUM FOR PERFORMING THE METHOD

(71) Applicant: Korea University Research and Business Foundation, Seoul (KR)

(72) Inventors: Hwangnam Kim, Seoul (KR); Seong-Joon Park, Seoul (KR); Seounghwan Oh, Seongnam-si (KR)

(73) Assignee: Korea University Research and Business Foundation, Seoul (KR)

( * ) Notice: Subject to any disclaimer, the term of this patent is extended or adjusted under 35 U.S.C. 154(b) by 164 days.

(21) Appl. No.: 16/899,751

(22) Filed: Jun. 12, 2020

(65) Prior Publication Data

US 2020/0394713 A1 Dec. 17, 2020

(30) Foreign Application Priority Data

Jun. 12, 2019 (KR) .................. 10-2019-0069172

(51) Int. Cl.
*G06Q 40/04* (2012.01)
*G06F 16/23* (2019.01)
(Continued)

(52) U.S. Cl.
CPC ......... *G06Q 40/04* (2013.01); *G06F 16/2365* (2019.01); *G06Q 20/3674* (2013.01);
(Continued)

(58) Field of Classification Search
CPC .................................................... G06Q 40/04
See application file for complete search history.

(56) References Cited

U.S. PATENT DOCUMENTS 10,855,758 B1 * 12/2020 O'Connell ............. G06F 21/00
10,939,405 B1 * 3/2021 Haleem
(Continued)

FOREIGN PATENT DOCUMENTS

JP          2011-141733 A    7/2011
KR   10-2011-0139021 A   12/2011
(Continued)

OTHER PUBLICATIONS

Kfoury, et al., in "Distributed Public Key Infrastructure and PSK Exchange Based on Blockchain Technology," from IEEE, 2018 ( Year: 2018).*

(Continued)

*Primary Examiner* — Olabode Akintola
*Assistant Examiner* — Brandon M Duck
(74) *Attorney, Agent, or Firm* — NSIP Law

(57) ABSTRACT

Disclosed is a method for trading private information access rights based on a distributed ledger, performed by a distributed network system including a plurality of distributed servers to perform authentication and store a token, the method including giving rights to use the token to a buyer terminal by performing authentication upon receiving a token trade request, permitting a service application server to use the token by performing authentication upon receiving a token usage request, providing, by the service application server, a predefined service by using the token and broadcasting usage detail of the token to the distributed network system, and updating, by the distributed server, the usage detail of the token.

13 Claims, 10 Drawing Sheets

(51) Int. Cl.
    *G06Q 20/36*         (2012.01)
    *G06Q 20/38*         (2012.01)
    *G06Q 50/26*         (2012.01)
    *G06Q 30/018*       (2023.01)

(52) U.S. Cl.
    CPC ....... *G06Q 20/3678* (2013.01); *G06Q 20/383* (2013.01); *G06Q 20/3825* (2013.01); *G06Q 30/0185* (2013.01); *G06Q 50/265* (2013.01); *G06Q 2220/12* (2013.01); *G06Q 2220/18* (2013.01)

(56) References Cited

U.S. PATENT DOCUMENTS

| | | | |
|---|---|---|---|
| 11,025,626 B1 * | 6/2021 | Todd | .............. H04L 63/10 |
| 11,080,689 B1 * | 8/2021 | Remeika | ............... G06Q 20/38 |
| 2009/0320118 A1 | 12/2009 | Muller et al. | |
| 2016/0224949 A1 | 8/2016 | Thomas et al. | |
| 2016/0321752 A1 * | 11/2016 | Tabacco | |
| 2019/0080407 A1 * | 3/2019 | Molinari | |
| 2020/0106610 A1 * | 4/2020 | Doddavula | |
| 2020/0279328 A1 * | 9/2020 | Zhiri | ................. G06Q 40/04 |
| 2020/0394651 A1 * | 12/2020 | Kreder | ............... G06Q 20/389 |
| 2021/0082044 A1 * | 3/2021 | Sliwka | ................ G06Q 40/025 |
| 2021/0192473 A1 * | 6/2021 | Meehan | ............... G06Q 20/065 |

FOREIGN PATENT DOCUMENTS

| | | | | |
|---|---|---|---|---|
| KR | 10-1428865 B1 | | 8/2014 | |
| KR | 10-1928087 B1 | | 2/2019 | |
| WO | WO 2020092900 | * | 5/2020 | ............. G06Q 40/04 |

OTHER PUBLICATIONS

Yoon et al., "Look, block chain data erasure technology patent application," Datanet, May 13, 2019, 5 pages.

* cited by examiner

METHOD FOR PROVIDING SERVICES REQUIRING PRIVATE INFORMATION USING ACCESS RIGHTS IN DISTRIBUTED NETWORK AND RECORDING MEDIUM FOR PERFORMING THE METHOD

CROSS-REFERENCE TO RELATED APPLICATION

This application claims the benefit under 35 USC 119(a) of Korean Patent Application No. 10-2019-0069172 filed on Jun. 12, 2019 in the Korean Intellectual Property Office, the entire disclosure of which is incorporated herein by reference for all purposes.

TECHNICAL FIELD

The present disclosure relates to a method for trading private information access rights based on a distributed ledger and a recording medium using the method, and more particularly, to private information trading using a distributed network system, whereby a task is performed without provision of private information in the field requiring private information, and a recording medium using the method.

BACKGROUND ART

The context described in this section is intended to provide background information for this embodiment, but does not constitute the related prior art.

There have been concerns about information leakage from certificate authorities that store and manage private information. In addition, as private information is stored in electronic form, it is easy to copy and distribute the private information, so issues such as leakage and unauthorized copying have been raised.

To solve this problem, authentication technology through digital signature, authentication technology using biometric information and private information security technology have been introduced.

The authentication technology through digital signature is an asymmetric key based technology in which a provider terminal transforms all or part of information with its private key, and afterwards, a different provider terminal recovers the information with a public key of the provider terminal, and it is the most widely used authentication technology in authenticating the reliability of information.

The authentication technology using biometric information includes biometric recognition technologies using fingerprint recognition, pupil and artery, and it is designed to overcome the reliability and utility limitations of text based authentication technology.

Public and private companies manage private information in databases, and due to economical and social impacts of large-scale private information leaks, high level of security is required, and various encryption technologies and authentication technologies are used.

However, the above-described technologies encrypt private information, and thus private information may be leaked by data mining, key extraction attacks, traces of activity and database hacking.

This is because it is necessary to directly provide private information in order to use infrastructures such as public/cloud services, and hacking and information leaks may occur due to centralized private data loading.

Accordingly, methods using the existing services without including private information and approaches for protection from hacking through decentralization have been suggested.

RELATED LITERATURES

Patent Literatures (Patent Literature 1) Korean Patent Publication No. 10-2011-0139021 (2011 Dec. 28)

DISCLOSURE

Technical Problem

The present disclosure is designed to address the above-described issue, and according to an aspect of the present disclosure, there is provided a method for trading private information access rights based on a distributed ledger using a trading infrastructure and an authentication technique to provide a service requiring private information without direct transmission of private information data and a recording medium using the method.

The technical problem of the present disclosure is not limited to the above-mentioned technical problem, and other technical problems not mentioned herein will be clearly understood by those having ordinary skill in the art from the following description.

Technical Solution

A method for trading private information access rights based on a distributed ledger according to an embodiment of the present disclosure, performed by a distributed network system including a plurality of distributed servers to perform authentication and store a token, may include giving, by the distributed server, rights to use the token to a buyer terminal by performing authentication when the distributed server receives a token trade request, permitting, by the distributed server, a service application server to use the token by performing authentication when the distributed server receives a token usage request, providing, by the service application server, a predefined service by using the token and broadcasting usage detail of the token to the distributed network system when the distributed server permits the use of the token, and updating, by the distributed server, the usage detail of the token.

In an embodiment, a plurality of tokens including same information may be distributed and stored in the plurality of distributed servers.

In an embodiment, the token may be a data format including provider terminal identification information, allowed service identification information, rights to use private information, provider signature, issuer signature and expiration condition.

In an embodiment, the expiration condition may be satisfied in any one of the following cases: when a preset available count exceeds, when a preset expiration date has passed, and when a stop request is received from a provider terminal.

In an embodiment, giving the rights to use the token may include receiving, by the distributed server, the token trade request from the buyer terminal through a token exchange, checking, by the distributed server, if the plurality of tokens stored in the distributed servers has a same data value when the distributed server receives the token trade request, and giving, by the distributed server, the rights to use the token to the buyer terminal when it is found that the plurality of tokens has the same data value.

In an embodiment, permitting the use of the token may include receiving, by the distributed server, the token usage request from the buyer terminal, checking, by the distributed server, if the plurality of tokens stored in the distributed servers has a same data value when the distributed server receives the token usage request, and checking, by the distributed server, the expiration condition of the token and permitting the service application server to use the token when it is found that the plurality of tokens has the same data value.

In an embodiment, permitting the service application server to use the token may include checking, by the distributed server, the expiration condition for one token, checking, by the distributed server, the expiration condition for all the tokens when it is found that the expiration condition is satisfied for one token, and permitting, by the distributed server, the service application server to use the token when it is found that the expiration condition is satisfied for all the tokens.

In an embodiment, checking the expiration condition for one token may include collecting, by the distributed server, token usage from one token, and determining, by the distributed server, if the usage request is valid by comparing the token usage and the available count of the expiration condition.

In an embodiment, determining if the usage request is valid may include determining, by the distributed server, that the usage request is invalid when the available count is smaller than the token usage, and rejecting, by the distributed server, the usage request from the buyer terminal.

In an embodiment, determining if the usage request is valid may include determining, by the distributed server, that the usage request is valid when the available count is larger than the token usage, and broadcasting, by the distributed server, the usage request to a different distributed server present in the distributed network system.

In an embodiment, checking the expiration condition for all the tokens may include collecting, by the distributed server, token usage from all the tokens, and verifying, by the distributed server, if the usage request is valid by comparing each of the plurality of token usages collected from the token and the available count of the expiration condition.

In an embodiment, verifying if the usage request is valid may include determining, by the distributed server, that there is an error in last usage detail of the token when at least one token usage collected from the token is larger than the available count, broadcasting, by the distributed server, the error in the last usage detail of the token to the distributed network system, deleting, by the distributed server, the last usage detail of the token, and rejecting, by the distributed server, the usage request from the buyer terminal.

In an embodiment, verifying if the usage request is valid may include verifying, by the distributed server, that the usage request is valid when all the token usages collected from the token is smaller than the available count, broadcasting, by the distributed server, to a different distributed server present in the distributed network system when it is verified that the usage request is valid, and transmitting, by the distributed server, a message of permission for the usage request to the service application server.

A computer-readable recording medium according to an embodiment of the present disclosure has recorded thereon a computer program for performing the method for trading private information access rights based on a distributed ledger.

Advantageous Effects

According to an aspect of the present disclosure as described above, the method for trading private information access rights based on a distributed ledger and the recording medium using the same according to the present disclosure provide the following effects: it is possible to allow for a service requiring private information without private information leaks, and prevent the reuse of private information and the publication of false information by the introduction of distributed ledger technology, thereby ensuring the fairness and reliability of private information trading markets.

The effects of the present disclosure are not limited to the above-mentioned effects, and other effects not mentioned herein will be clearly understood by those having ordinary skill in the art from the following description.

BEST MODE

Figure 1:
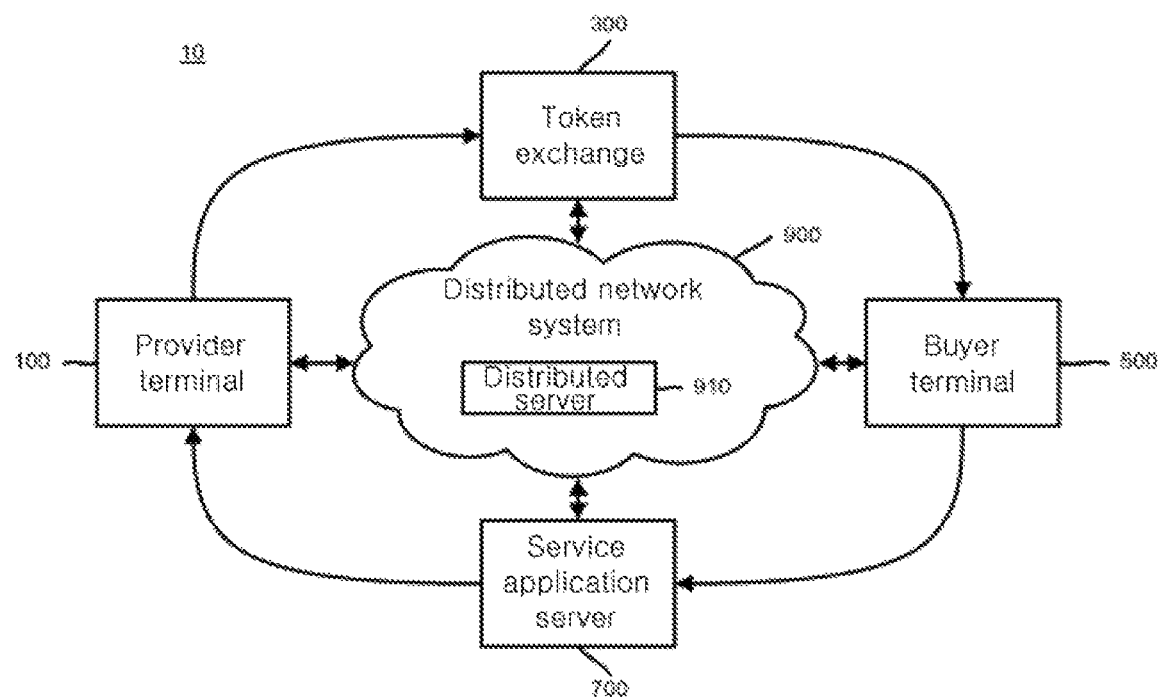
FIG. 1 is a diagram showing a system for trading private information access rights according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those having ordinary skill in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, exemplary embodiments of the present disclosure will be described in more detail with reference to the accompanying drawings.

FIG. 1 is a diagram showing a system for trading private information access rights based on a distributed ledger according to an embodiment of the present disclosure.

Referring to FIG. 1, it can be seen that the system 10 for trading private information access rights includes a provider terminal 100, a token exchange 300, a buyer terminal 500, a service application server 700 and a distributed network system 900.

The provider terminal 100 may provide a token F10 as described below, instead of private information, and generate the token F10 by requesting the token exchange 300 as described below to issue the token F10.

The request for issuance of the token F10 from the provider terminal 100 may be made into a contract in a periodic manner, for example, several times per day/week/month at the time of generation, and the usage and trade details of the corresponding token F10 are each verified and recorded as transaction in the distributed network system 900.

In this instance, to motivate the provider terminal 100 to generate the token F10, the provider terminal 100 receives an incentive for a portion of payment made by the buyer terminal 500 as described below.

The token exchange 300 may generate the token F10 in response to the request from the provider terminal 100, and the provider terminal 100 and the buyer terminal 500 may trade in the token exchange 300.

The buyer terminal 500 may purchase the token F10 in the token exchange 300 to access the provider terminal 100 through the service application server 700.

The buyer terminal 500 may acquire rights to use the token F10 by buying the token F10, and after acquiring the rights to use, may receive a service by using the token F10 to the service application server 700.

The service application server 700 may provide the buyer terminal 500 with a desired service by using the token F10. In this instance, the service application server 700 may receive a portion of payment made by the buyer terminal 500 when the buyer terminal 500 purchases the token F10 in return for providing the service.

As the trade of the token F10 is carried out on the network, a trading infrastructure for ensuring the reliability of electronic trade is necessary.

To satisfy the need, the distributed network system 900 is included as a token trading platform.

A distributed server 910 of the distributed network system 900 may include at least one token F10.

When the provider terminal 100 generates the token F10, the token F10 is recorded in the distributed server 910 in which tokens are stored, and a plurality of tokens F10 having the same data is generated due to the characteristics of the distributed system.

The distributed network system 900 may include the distributed server 910 to store the token F10 and verify the validity of the process of using and trading the token F10.

Accordingly, it is possible to prevent malicious uses by verifying ① if the token F10 was issued through a valid authentication procedure, ② if the token F10 was traded through valid payment, and ③ if the token F10 was used and expired as originally intended.

Figure 2:
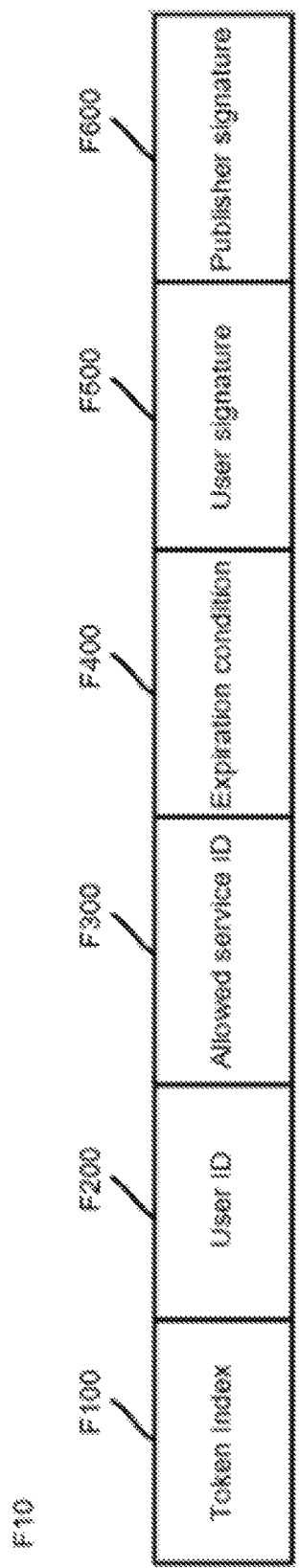
FIG. 2 is a structure diagram showing a data format of a token according to an embodiment of the present disclosure.

FIG. 2 is a structure diagram showing the data format of the token F10 according to an embodiment of the present disclosure.

The token F10 may define a series of processes using private information of a particular provider terminal 100 as a unit action, and specify the rights to use for the corresponding action.

For example, for a telemarketing company to make a call to the provider terminal 100, the provider terminal 100 consents to private information use, the collected private information is transmitted through trade, and the telemarketing company makes a call by the direct use of the corresponding number.

As opposed to the related art, according to the proposed system, one token F10 specifies the rights for an action of making a call to the provider terminal 100, and the telemarketing company may make a call to the provider terminal 100 by purchasing the corresponding token F10.

In this instance, the token F10 does not includes information about the telephone number of the provider terminal 100, and the corresponding token F10 is transmitted to a call connection institution (a telephone company) to form a channel for calling with the provider terminal 100.

As the action of using private information forms a unit and has a start point and an end point, the rights to use private information proved as the token F10 have an expiration period when it goes into effect.

That is, a method for preventing the reuse of the token F10 is necessary, and it is possible to prevent the reuse of the token F10 by putting an expiration condition F400 on the token F10.

The service application server 700 receives the token F10 that the buyer terminal 500 purchased, provides a service between the provider terminal 100 and the buyer terminal 500, and informs the distributed ledger network of the fact that the service was provided, to reflect on the usage status of the token F10.

When the expired token F10 is transmitted, the service application server 700 identifies it through the distributed network system 900 and rejects the usage request of the token F10.

The corresponding token F10 specifies the expiration condition F400, and when the expiration condition F400 is reached, the token F10 cannot be used any longer. In this way, it is possible to use a necessary service without transmission and provision of private information.

Referring to FIG. 2, it can be seen that the token F10 includes token index F100, identification information F200 of the provider terminal 100, allowed service identification information F300, expiration condition F400, signature F500 of the provider terminal 100 and issuer signature F600.

The token F10 is a series of data, and its data format is as below. FIG. 2 is provided by way of illustration, and the data format includes all types of data formats for representing the rights F300 to use the service, the expiration condition F400, the user authentication method and the authorized service.

In this instance, the signature F500 of the provider terminal 100 and the signature F600 of the token exchange 300 are used to verify if the token F10 is fake, and the payment made by the buyer terminal 500 may be given to the provider terminal 100 every single time the token F10 is used.

Figure 3:
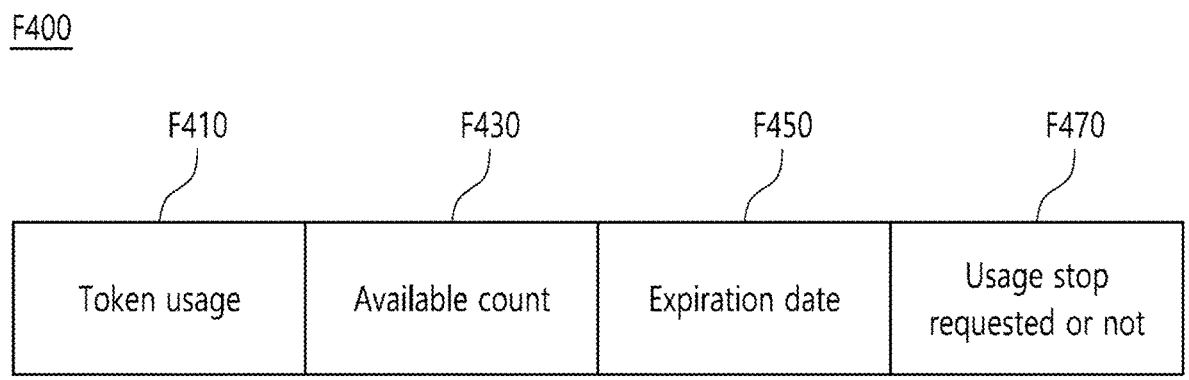
FIG. 3 is a structure diagram showing a data format of an expiration condition according to an embodiment of the present disclosure.

FIG. 3 is a structure diagram showing the data format of the expiration condition according to an embodiment of the present disclosure.

Referring to FIG. 3, it can be seen that the expiration condition F400 includes token usage F410, available count F430, expiration date F450 and usage stop requested or not F470.

In this instance, the expiration condition F400 may include all types of actions to change the availability of the token F10, including token usage F410, available count F430, available period F450, and manual expiration F450 as per user request F470.

The token usage F410 refers to the number of times the service application server 700 provided a service by using the token F10 in response to the usage request from the buyer terminal 500.

The available count F430 refers to the number of times the token F10 can be used, and is set when the token F10 is generated for the first time.

The expiration date F450 refers to the last date on which the token F10 can be used, and is set when the token F10 is generated for the first time.

The service application server 700 compares the expiration date F450 and the current time when using the token F10, and when the current time is before the expiration date F450, provides a service by using the token F10, and if not so, the service application server 700 notifies the buyer terminal 500 that the token F10 cannot be used.

The usage stop requested or not F470 is activated when a usage stop request is directly made by the provider terminal 100.

When the usage stop request is activated, even though the token usage F410 is smaller than the available count F430 and there is time left until the expiration date F450, the service application server 700 notifies the buyer terminal 500 that the token F10 cannot be used.

That is, an action to use the token F10 satisfying the expiration condition F400 is detected by the distributed network system 900, and the token F10 cannot be used.

Figure 4:
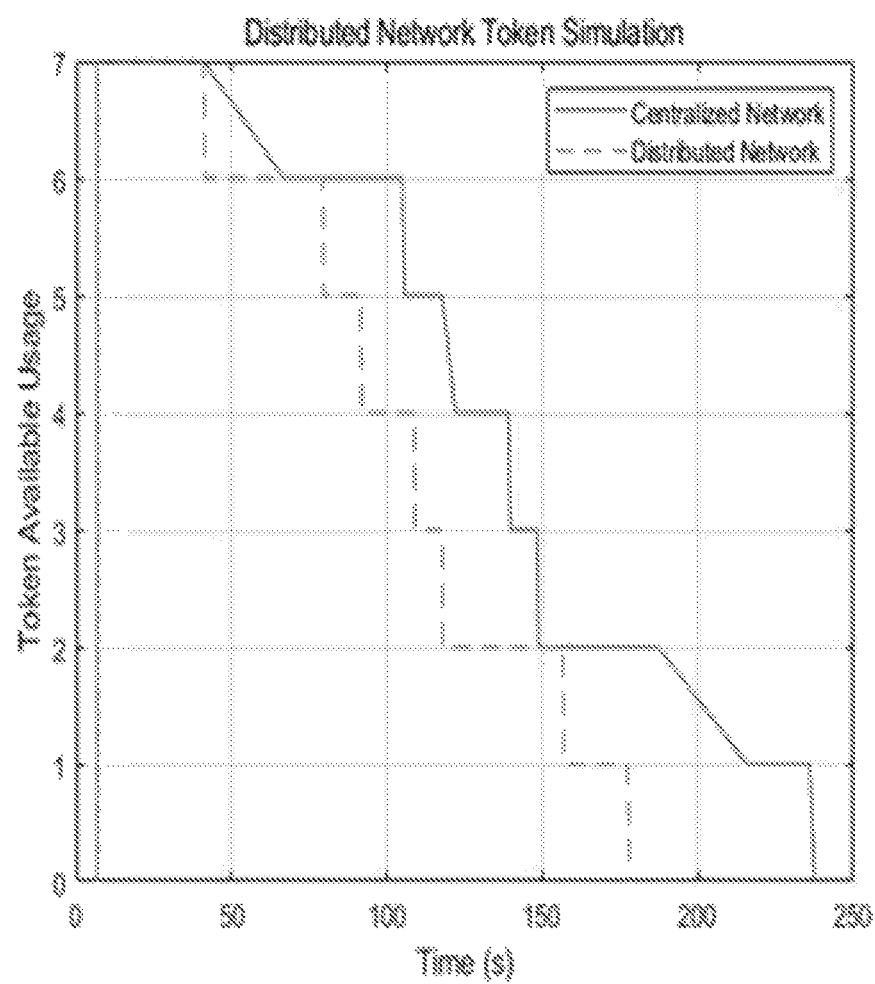
FIG. 4 is a diagram showing the latency when a distributed network is used and the latency when a centralized network is used to perform a method for trading private information access rights based on a distributed ledger according to an embodiment of the present disclosure.

FIG. 4 is a diagram showing the latency when the distributed network system 900 is used and the latency when a centralized network is used to perform a method for trading private information access rights based on a distributed ledger according to an embodiment of the present disclosure.

As the service trading system based on the token F10 gives the rights to use the token F10, there is latency in trade authentication every single time the token F10 is used.

The latency $D_{cent}$ of the centralized network may be calculated by the following Equation 1.

$$D_{cent} = \max\left\{\frac{NF}{u_s}, \frac{F}{d_{min}}\right\} \quad \text{[Equation 1]}$$

Here, N denotes the number of nodes in the network, F denotes the size of a trade request message, $u_s$ denotes the upload speed on the sender side, and $d_{min}$ denotes the minimum download speed on the receiver side.

The latency $D_{dist}$ of the distributed network may be calculated by the following Equation 2.

$$D_{dist} = \max\left\{\frac{F}{u_s}, \frac{F}{d_{min}}, \frac{NF}{u_s + \sum_{i=1}^{N} u_i}\right\} \quad \text{[Equation 2]}$$

Here, N denotes the number of nodes in the network, F denotes the size of a trade request message, $u_s$ denotes the upload speed on the sender side, $d_{min}$ denotes the minimum download speed on the receiver side, and $u_i$ denotes the upload speed of each node.

Referring to FIG. 4, it can be seen that latency is shorter when authentication is performed through the distributed network than when the authentication procedure is performed on the centralized network.

The method for trading private information access rights based on a distributed ledger according to an embodiment of the present disclosure is performed on substantially the same configuration as the system 10 for trading private information access rights shown in FIG. 1, and the same element as the system 10 for trading private information access rights shown in FIG. 1 is given the same reference symbol, and redundant descriptions are omitted herein.

Figure 5:
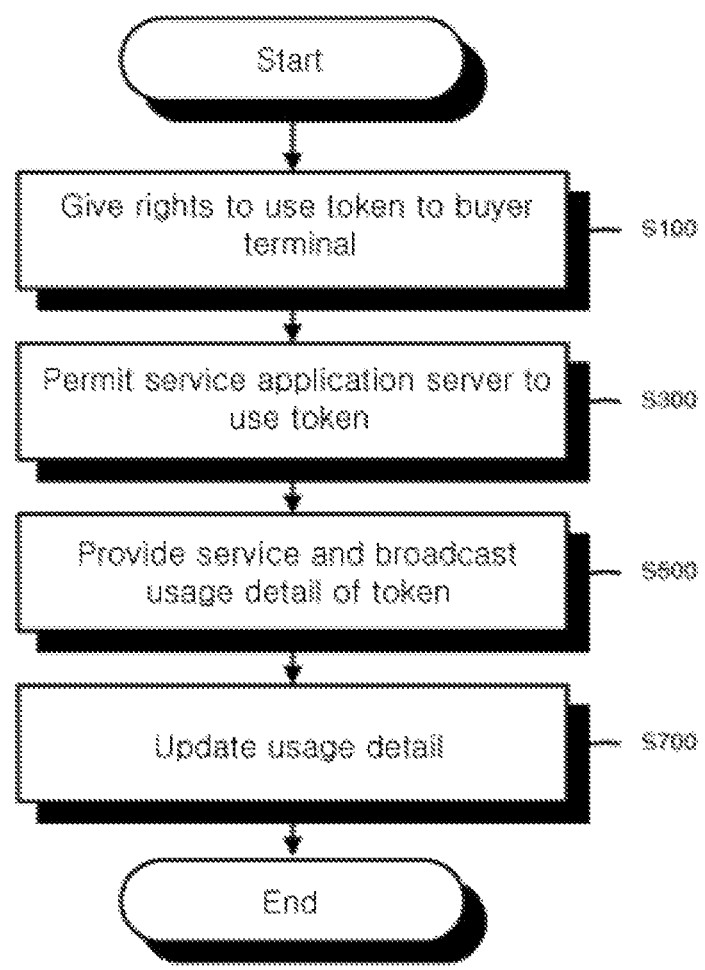
FIG. 5 is a flowchart showing a method for trading private information access rights based on a distributed ledger according to an embodiment of the present disclosure.

FIG. 5 is a flowchart showing the method for trading private information access rights based on a distributed ledger according to an embodiment of the present disclosure.

The method for trading private information access rights based on a distributed ledger according to the present disclosure may be performed by the above-described system 10 for trading private information access rights according to the present disclosure. To this end, the system 10 for trading private information access rights according to the present disclosure may have a pre-installed application (software) for performing each step of the method for trading private information access rights based on a distributed ledger as described below.

For example, the computer of the system 10 for trading private information access rights may have a platform for the method for trading private information access rights based on a distributed ledger according to the present disclosure, pre-installed in the form of software, and the system 10 for trading private information access rights may receive a variety of services provided by the method for trading private information access rights based on a distributed ledger according to the present disclosure by running the software installed in the computer.

Referring to FIG. 5, shown is the method for trading private information access rights based on a distributed ledger including the distributed network system 900 that performs authentication using the distributed server 910 including the token F10.

The token exchange 300 may generate a token to the distributed server 910 in response to a token issuance request from the provider terminal 100.

The provider terminal 100 may authenticate itself using zero-knowledge proof not including private information of the provider terminal 100.

For the provider terminal 100 to 'trade' the rights to use its private information, the provider terminal 100 verifies if the provider terminal 100 is an owner of corresponding information and the corresponding information is valid.

In response to the request for issuance of the token F10 from the provider terminal 100, the token exchange 300 proves the authentication of the provider terminal 100 based on zero-knowledge.

That is, the provider terminal 100 proves that the provider terminal 100 is an owner of private information required for issuance, and in this instance, private information is not transmitted to the issuer of the token F10.

When authentication succeeds, the token F10 is generated, and the corresponding token F10 is exposed to the buyer terminal 500 in the token exchange 300.

However, as private information is not exchanged, information of the user (who consents to an action of using private information) cannot be published.

When the distributed server 910 receives a token trade request, the distributed server 910 may give the rights to use the token F10 to the buyer terminal 500 by performing authentication (S100).

When the distributed server 910 receives a token usage request, the distributed server 910 may permit the service application server 700 to use the token F10 by performing authentication (S300).

When the distributed server 910 permits the use of the token F10, the service application server 700 may provide a predefined service by using the token F10, and broadcast the usage detail of the token F10 to the distributed network system 900 (S500).

The distributed server 910 may update the usage detail of the token F10 (S700).

Figure 6:
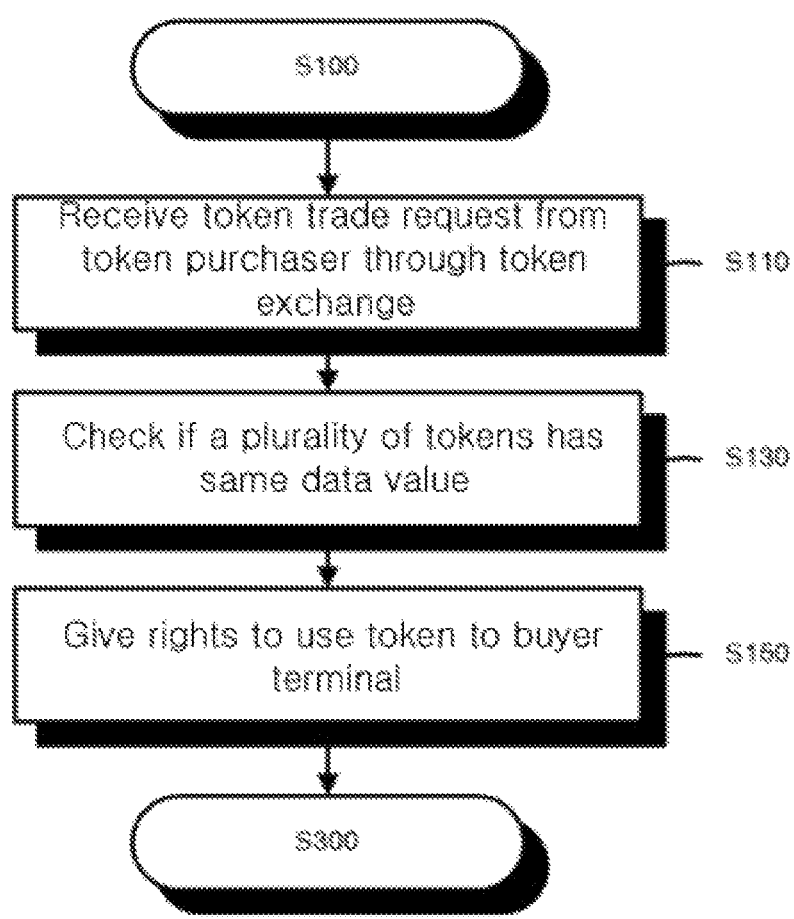
FIG. 6 is a flowchart showing a process of acquiring rights to use a token according to an embodiment of the present disclosure.

FIG. 6 is a flowchart showing the process in which the buyer terminal 500 acquires the rights to use the token F10 by performing authentication through the distributed network system 900 according to an embodiment of the present disclosure.

Referring to FIG. 6, shown is the process in which when the distributed server 910 receives a token trade request, the distributed server 910 gives the rights to use the token F10 to the buyer terminal 500 by performing authentication.

The distributed server 910 may receive the token trade request from the buyer terminal 500 through the token exchange 300 (S110).

When the distributed server 910 receives the token trade request, the distributed server 910 may check if the plurality of tokens F10 stored in the distributed server 910 has the same data value (S130).

When it is found that the plurality of tokens F10 has the same data value, the distributed server 910 may give the rights to use the token F10 to the buyer terminal 500 (S150).

Figure 7:
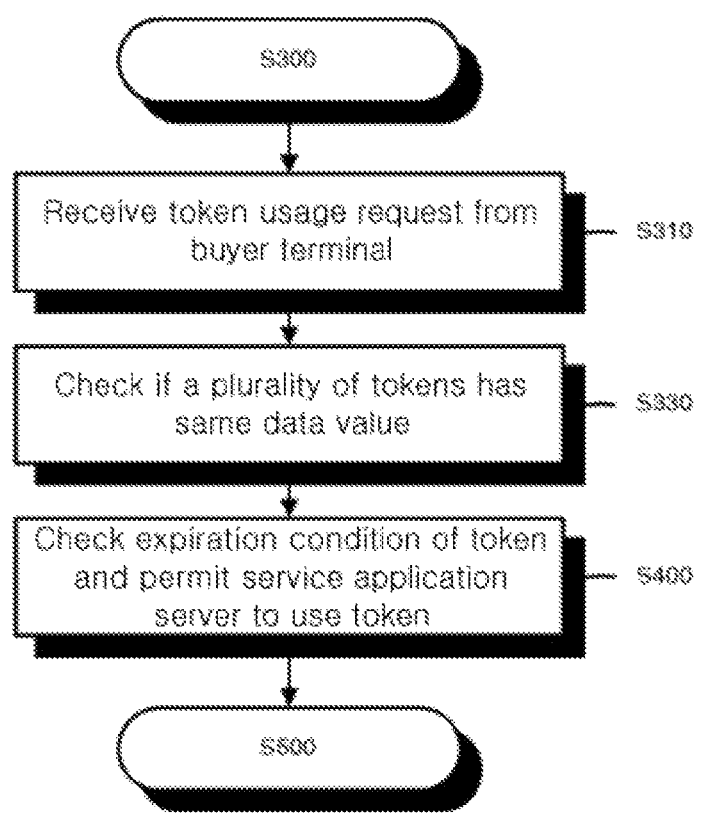
FIG. 7 is a flowchart showing a process of permitting a service application server to use a token when a distributed server receives a token usage request according to an embodiment of the present disclosure.

FIG. 7 is a flowchart showing the process of permitting the service application server to use the token F10 when the distributed server 910 receives the usage request of the token F10 according to an embodiment of the present disclosure.

Referring to FIG. 7, shown is the process of acquiring permission to use the token F10 through the distributed network system 900 in response to the usage request from the buyer terminal 500 having acquired the rights to use.

The distributed server 910 may receive the token usage request from the buyer terminal 500 (S310).

When the distributed server 910 receives the token usage request, the distributed server 910 may check if the plurality of tokens F10 stored in the distributed server 910 has the same data value (S330).

When it is found that the plurality of tokens F10 has the same data value, the distributed server 910 may check the expiration condition of the token F10 and permit the service application server 700 to use the token F10 (S400).

Figure 8:
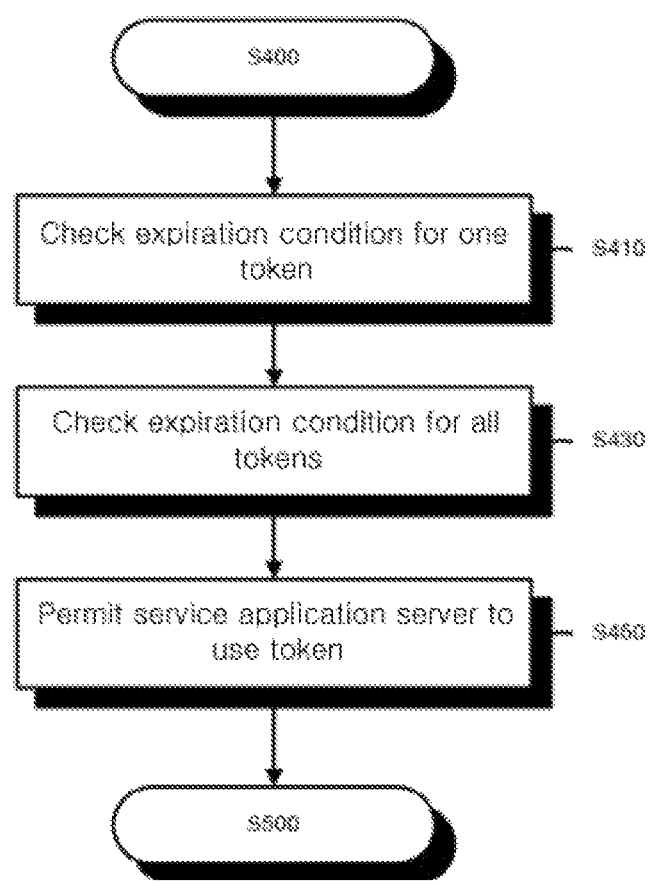
FIG. 8 is a flowchart showing a detailed process of permitting the use of a token according to an embodiment of the present disclosure.

FIG. 8 is a flowchart showing the detailed process of permitting the use of the token F10 according to an embodiment of the present disclosure.

Referring to FIG. 8, shown is the process of checking the expiration condition of the token F10 and permitting the service application server 700 to use the token F10.

The distributed server 910 may check the expiration condition for one token F10 (S410).

When it is found that the expiration condition is satisfied for one token F10, the distributed server 910 may check the expiration condition for all the tokens F10 (S430).

When it is found that the expiration condition is satisfied for all the tokens F10, the distributed server 910 may permit the service application server 700 to use the token F10 (S450).

Figure 9:
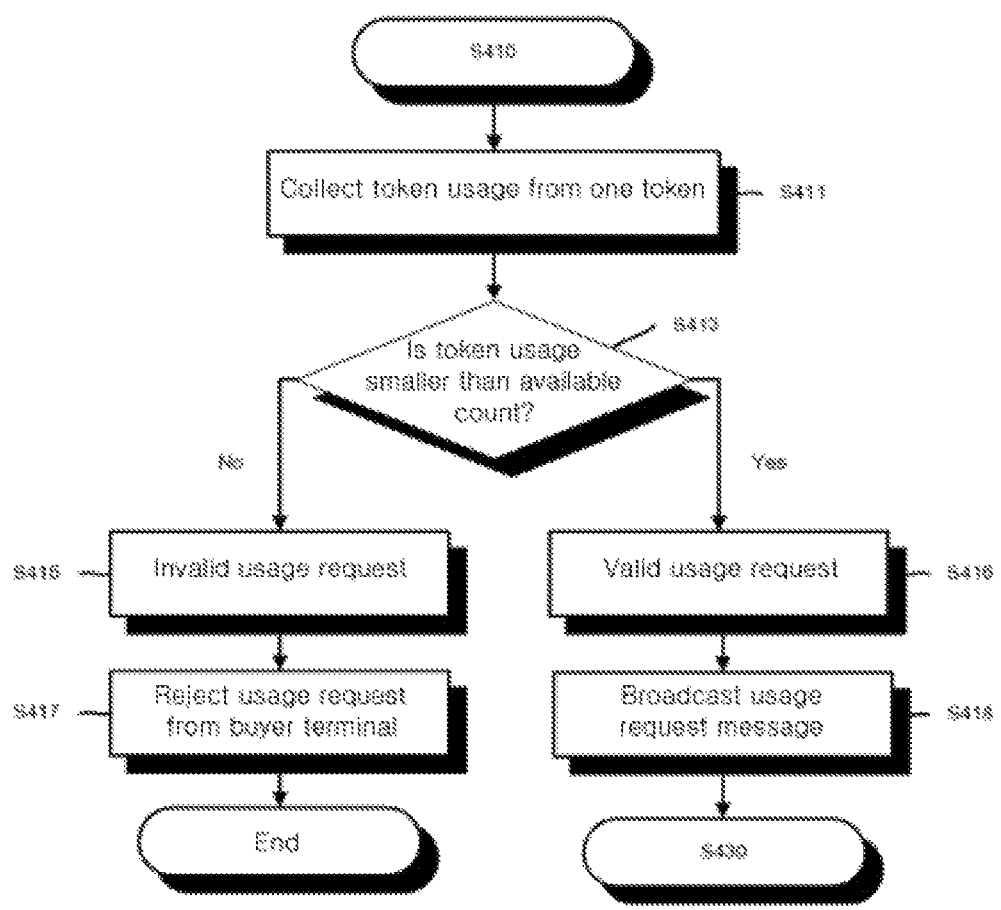
FIG. 9 is a flowchart showing a process of checking an expiration condition for one token according to an embodiment of the present disclosure.

FIG. 9 is a flowchart showing the process of checking the expiration condition for one token F10 according to an embodiment of the present disclosure.

Referring to FIG. 9, shown is the detailed process of checking the expiration condition for one token F10.

The service application server 700 may collect the token usage F410 from one token F10 (S411).

The distributed server 910 may collect the token usage F410 from one token F10 (S411).

The distributed server 910 may determine if the usage request is valid by comparing the token usage F410 and the available count F430 of the expiration condition (S413).

When the available count F430 is smaller than the token usage F410, the service application server 700 may determine that the usage request is invalid (S415), and reject the usage request from the buyer terminal 500 (S417).

Additionally, when the available count F430 is larger than the token usage F410, the service application server 700 may determine that the usage request is valid (S416), and broadcast the usage request message to the distributed network system 900 (S418).

Figure 10:
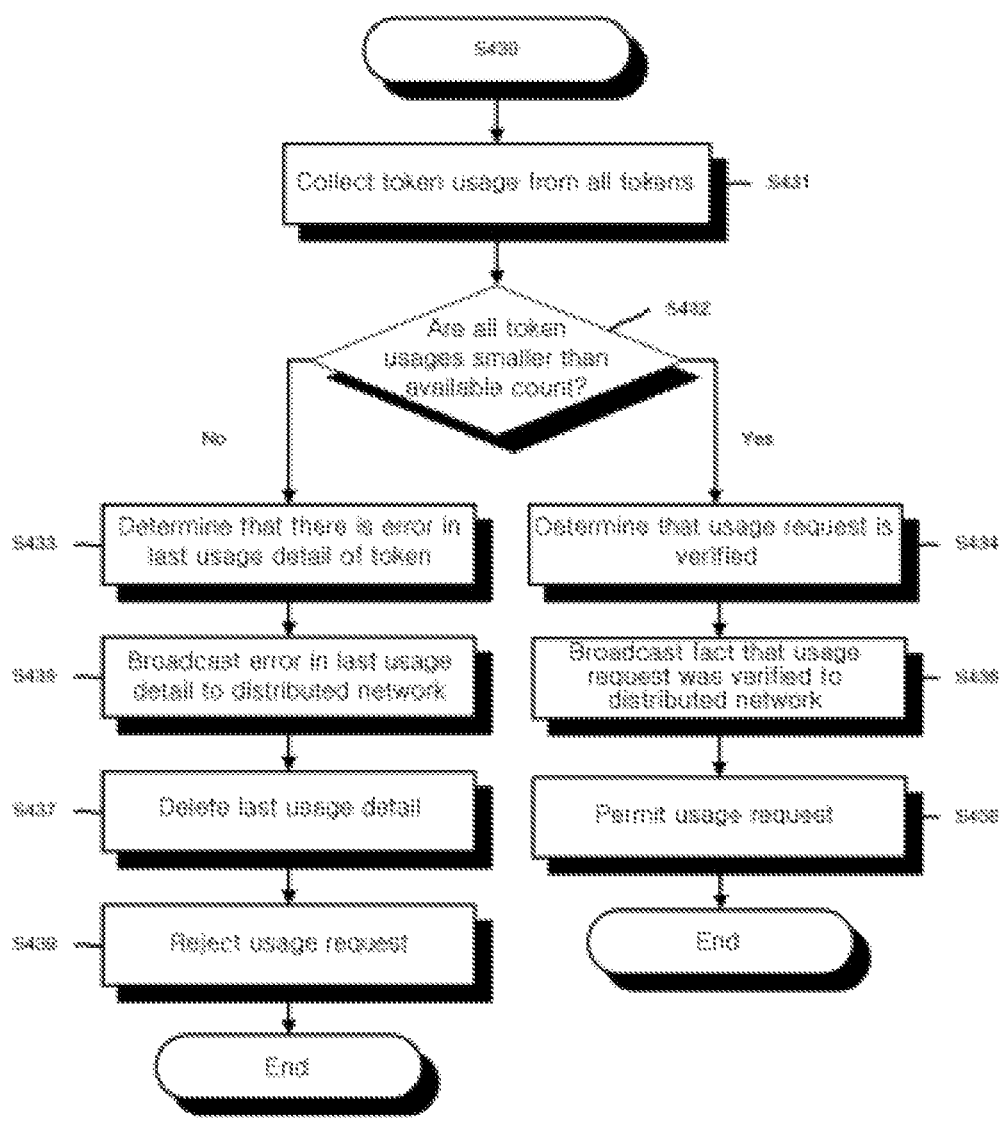
FIG. 10 is a flowchart showing a process of checking an expiration condition for all tokens according to an embodiment of the present disclosure.

FIG. 10 is a flowchart showing the process of checking the expiration condition for all the tokens F10 according to an embodiment of the present disclosure.

Referring to FIG. 10, shown is the detailed process of checking the expiration condition for all the tokens F10.

The distributed server 910 may collect the token usage F410 from all the tokens F10 (S431).

The distributed server 910 may verify if the usage request is valid by comparing each of the plurality of token usages F410 collected from the token F10 and the available count F430 of the expiration condition (S432).

When at least one token usage F410 collected from the token F10 is larger than the available count F430, the distributed server 910 may determine that there is an error in the last usage detail of the token F10 (S433).

The distributed server 910 may broadcast the error in the last usage detail of the token F10 to the distributed network system 900 (S435), delete the last usage detail of the token F10 (S437), and reject the usage request from the buyer terminal 500 (S439).

Additionally, when all the token usages F410 collected from the token F10 are smaller than the available count F430, the distributed server 910 may verify that the usage request is valid (S434).

When the usage request is verified to be valid, the distributed server 910 may broadcast to a different distributed server 910 present in the distributed network system 900 (S436), and the distributed server 910 may permit the usage request to the service application server 700 (S438).

The method for trading private information access rights based on a distributed ledger may be implemented as an application or in the form of program instructions that may be executed through various computer components and may be recorded in computer-readable recording media. The computer-readable recording media may include program instructions, data files and data structures, alone or in combination.

The program instructions recorded in the computer-readable recording media are specially designed and configured for the present disclosure and may be known and available to those having ordinary skill in the field of computer software.

Examples of the computer-readable recording media include hardware devices specially designed to store and execute program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, or vice versa.

As described hereinabove, the method for trading private information access rights based on a distributed ledger according to the present disclosure allows for a service requiring private information without private information leaks, and verifies the reliability of the commercialization and trade process of private information.

While the present disclosure has been hereinabove described with reference to the embodiments, it will be understood by those having ordinary skill in the corresponding technical field that various modifications and changes may be made to the present disclosure without departing from the spirit and scope of the present disclosure as defined by the appended claims.

The invention claimed is:

1. A processor-implemented method for securely providing services, requiring private information, using access rights to the private information without directly using the private information while securely maintained, and performed by a network system comprising a provider terminal, a token exchange, a user terminal, a service application server, and a plurality of distributed servers configured to perform authentication and store tokens to provide the services, the method comprising:
    performing first authentication of the user terminal, using a pair of public and private keys for encryption and decryption of the private information, in response to a distributed server, of the plurality of distributed servers, receiving a first token request associated with a token of the tokens;
    providing, by the distributed server of the plurality of distributed servers, a right to use the token to the user terminal based on a result of performing the first authentication;
    performing second authentication of the user terminal using the pair of public and private keys, in response to the distributed server receiving a second token request associated with the token;
    permitting, by the distributed server, the service application server to use the token based on a result of performing the second authentication;
    securely providing, by the service application server, the services, requiring the private information, to the user terminal, using information securely included in the token, without directly providing the private information;
    broadcasting usage detail of the token to the plurality of distributed servers present in a distributed network, when the distributed server permits the use of the token; and
    updating, by the distributed server, the usage detail of the token for subsequent token requests,
    wherein a plurality of tokens including same information are distributed and stored in the plurality of distributed servers to enable the services that require the private information using the information securely included in the token, without directly providing the private information while the private information is securely maintained.

2. The processor-implemented method of claim 1, wherein the token is a data format including provider terminal identification information, allowed service identification information, rights to use private information, provider signature, issuer signature and expiration condition.

3. The processor-implemented method of claim 2, wherein the expiration condition is satisfied in any one of the following cases:
    when a preset available count exceeds,
    when a preset expiration date has passed, and
    when a stop request is received from the provider terminal.

4. The processor-implemented method of claim 3, wherein the permitting the use of the token comprises:
    receiving, by the distributed server, the second token request from the user terminal;
    checking, by the distributed server, if the plurality of tokens stored in the plurality of distributed servers have a same data value when the distributed server receives the second token request; and
    checking, by the distributed server, the expiration condition of the token and permitting the service application server to use the token when it is found that the plurality of tokens have the same data value.

5. The processor-implemented method of claim 4, wherein the permitting the service application server to use the token comprises:
    checking, by the distributed server, the expiration condition for one token;
    checking, by the distributed server, the expiration condition for all the tokens when it is found that the expiration condition is satisfied for one token; and
    permitting, by the distributed server, the service application server to use the token when it is found that the expiration condition is satisfied for all the tokens.

6. The processor-implemented method of claim 5, wherein the checking of the expiration condition for one token comprises:
    collecting, by the distributed server, token usage from one token; and
    determining, by the distributed server, if the second token request is valid by comparing the token usage and the available count of the expiration condition.

7. The processor-implemented method of claim 6, wherein the determining if the second token request is valid comprises:
    determining, by the distributed server, that the second token request is invalid when the available count is smaller than the token usage; and
    rejecting, by the distributed server, the second token request from the user terminal.

8. The processor-implemented method of claim 6, wherein the determining if the second token request is valid comprises:
    determining, by the distributed server, that the second token request is valid when the available count is larger than the token usage; and
    broadcasting, by the distributed server, the second token request to a different distributed server present in the distributed network.

9. The processor-implemented method of claim 5, wherein the checking of the expiration condition for all the tokens comprises:

collecting, by the distributed server, token usage from all the tokens; and verifying, by the distributed server, if the second token request is valid by comparing each of the plurality of token usages collected from the token and the available count of the expiration condition.

10. The processor-implemented method of claim 9, wherein the verifying if the second token request is valid comprises:

determining, by the distributed server, that there is an error in last usage detail of the token when at least one token usage collected from the token is larger than the available count;

broadcasting, by the distributed server, the error in the last usage detail of the token to the distributed network;

deleting, by the distributed server, the last usage detail of the token; and rejecting, by the distributed server, the second token request from the user terminal.

11. The processor-implemented method of claim 9, wherein the verifying if the second token request is valid comprises:

verifying, by the distributed server, that the second token request is valid when all the token usages collected from the token is smaller than the available count;

broadcasting, by the distributed server, to a different distributed server present in the distributed network when it is verified that the second token request is valid; and permitting, by the distributed server, the second token request to the service application server.

12. The processor-implemented method of claim 1, wherein the providing of the right to use the token comprises:

receiving, by the distributed server, the first token request from the user terminal through the token exchange;

checking, by the distributed server, if the plurality of tokens stored in the plurality of distributed servers have a same data value when the distributed server receives the first token request; and providing, by the distributed server, the right to use the token to the user terminal when it is found that the plurality of tokens have the same data value.

13. A non-transitory computer-readable recording medium having recorded thereon a computer program for performing the method of claim 1.

* * * * *